(12) United States Patent
Yoon et al.

(10) Patent No.: US 8,107,563 B2
(45) Date of Patent: Jan. 31, 2012

(54) RECEIVING APPARATUS AND METHOD FOR MIMO SYSTEM

(75) Inventors: Chanho Yoon, Daejon (KR); Il-Gu Lee, Seoul (KR); Jung-Bo Son, Daejon (KR); Eun-Young Choi, Daejon (KR); Yu-Ro Lee, Daejon (KR); Sok-Kyu Lee, Daejon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 732 days.

(21) Appl. No.: 12/177,655

(22) Filed: Jul. 22, 2008

(65) Prior Publication Data

US 2009/0154608 A1    Jun. 18, 2009

(30) Foreign Application Priority Data

Dec. 18, 2007    (KR) .................. 10-2007-0133529

(51) Int. Cl.
*H04L 27/14*    (2006.01)
(52) U.S. Cl. ........ 375/341; 375/260; 375/262; 375/267; 375/340; 375/343
(58) Field of Classification Search .................. 375/341, 375/260, 262, 267, 340, 343, 346; 370/204, 370/205, 206, 208, 209, 210; 455/59
See application file for complete search history.

(56) References Cited

U.S. PATENT DOCUMENTS

| | | | | |
|---|---|---|---|---|
| 7,720,169 | B2 * | 5/2010 | Reuven et al. | 375/267 |
| 7,724,838 | B2 * | 5/2010 | Mantravadi | 375/295 |
| 2007/0153943 | A1 * | 7/2007 | Nissila | 375/341 |
| 2008/0240299 | A1 * | 10/2008 | Huang et al. | 375/332 |

FOREIGN PATENT DOCUMENTS

| | | |
|---|---|---|
| KR | 1020060012825 | 2/2006 |
| KR | 10-2006-0012825 | 9/2006 |
| KR | 10-2007-0079448 | 8/2007 |

OTHER PUBLICATIONS

Yuro Lee et al., "A New MIMO Algorithm for High Data Rate Transmission", The 2nd International Conference on Wireless Broadband and Ultra Wideband Communications, 2007.
Kenichi Higuchi, et al., "Adaptive Selection of Surviving Symbol Replica Candidates Based on Maximum Reliability in QRM-MLD for OFCDM MIMO Multiplexing", IP Radio Network Development Department, pp. 2480-2486.
Kenichi Higuchi et al. "Adaptive Selection of Surviving Symbol Replica Candidates Based on Maximum Reliability in QRM-MLD for OFCDM MIMO Multiplexing", IEEE Communication Society Globecom 2004, Dec. 2004, pp. 2480-2486, vol. 2.

* cited by examiner

*Primary Examiner* — Dhaval Patel
(74) *Attorney, Agent, or Firm* — Kile Park Goekjian Reed & McManus PLLC

(57) ABSTRACT

Provided are a receiving apparatus for a multiple input multiple output (MIMO) system and a method thereof. The receiving apparatus includes a QR decomposing unit for calculating a single (Q) matrix vector and an upper triangle (R) matrix vector for a receiving signal vector; a first symbol estimation unit for estimating predetermined symbols using the calculated Q matrix vector and R matrix vector; a log likelihood ratio (LLR) calculating unit for calculating log likelihood ratios of unit bits for the estimated symbols; an interference removing unit for receiving a decoded signal that is decided using the calculated log likelihood ratios and removing interference from the receiving signal vector; and a second symbol estimation unit for linearly estimating remaining symbols for the interference removed signal.

10 Claims, 3 Drawing Sheets

RECEIVING APPARATUS AND METHOD FOR MIMO SYSTEM

CROSS-REFERENCE TO RELATED APPLICATIONS

The present invention claims priority of Korean Patent Application No. 10-2007-0133529, filed on Dec. 18, 2007, which is incorporated herein by reference.

BACKGROUND OF THE INVENTION

1. Field of the Invention

The present invention relates to a receiving apparatus for a multiple input multiple output (MIMO) system and a method thereof; and, more particularly, to a receiving apparatus and a method thereof for improving a signal detection performance with computational complexity reduced using linear and nonlinear receiving schemes together when a receiving signal is detected in a double space time block code-orthogonal frequency division multiplexing (STBC-OFDM) system which is one of MIMO-OFDM technologies.

This work was supported by the IT R&D program of MIC/IITA [2006-S-014-02, "Development of IEEE 802.11n Modem & RF Chip-sets with Data Rate 200 Mbps"].

2. Description of Related Art

It is a requirement of a wireless communication system to transmit a large amount of high quality multimedia data using a limited frequency. As a method for transmitting a large amount of data using a limited frequency, a multiple input and multiple output (MIMO) system was introduced. The MIMO system forms a plural of independent fading channels using a multiple antenna at receiving and transmitting ends and transmits different signals through each of transmitting antennas, thereby significantly increasing a data transmit rate. Accordingly, the MIMO system can transmit a large amount of data without expanding frequency.

However, the MIMO system has a shortcoming that the MIMO system is too fragile for inter-symbol interference (ISI) and frequency selective fading. In order to overcome the shortcomings, an orthogonal frequency division multiplexing (OFDM) technology was used. The OFDM scheme is the most proper modulation scheme for transmitting data at a high speed. The OFDM scheme transmits one data row through a subcarrier having a low data transmit rate.

A channel environment for wireless communication has a multiple paths due to obstacles such as buildings. In a wireless channel environment having multi-paths, delay spray is generated due to the multiple paths. If a time of delay spray is longer than a time of transmitting a next symbol, inter-symbol interference (ISI) is generated. In this case, fading is selectively generated in a frequency domain (frequency selective fading). In case of using single carrier, an equalizer is used to remove the ISI. However, complexity of the equalizer increases if a data transmit rate increases.

The shortcomings of the MIMO system can be attenuated using an orthogonal frequency division multiplexing (OFDM) technology. In order to overcome the shortcomings of the MIMO system with the advantages of the MIMO system maintained, an OFDM technology was applied to a MIMO system having N transmitting antennas and N receiving antennas. That is, a MIMO-OFDM system was introduced.

FIGS. 1a and 1b are block diagrams schematically illustrating a double STBC-OFDM system, which is one of MIMO-OFDM technologies. FIG. 1a is a block diagram illustrating a transmitting apparatus, and FIG. 1b is a block diagram illustrating a receiving apparatus.

Referring to FIG. 1a, the transmitting apparatus of the double STBC-OFDM system includes a demultiplexer 101, encoders 102, interleavers 103, quadrature amplitude modulation (QAM) mappers 104, inverse fourier transform (IFFT) units 105, cyclic prefix (CP) inserters 106, serial-to-parallel (S/P) converters 107, and space time block code (STBC) transmitters 108. The demultiplexer 101 divides a transmit bit stream into a plurality of data rows. The encoders 102 encode corresponding data rows. The encoded data are interleaved by the interleavers 103 and inputted to the QAM mappers 104. The QAM mappers 104 modulate the interleaved data according to a modulation scheme such as binary phase shift keying (BPSK), quadrature phase shift keying (QPSK), 16-quadrature amplitude modulation (16QAM), and 64QAM. The modulated symbols are transformed to signals in a time domain through inverse fast Fourier transform (IFFT) units 105. The CP inserters 106 insert a cyclic prefix (CP) code for a guard interval into the transformed symbols. The S/P converters 107 convert the CP code inserted signal to parallel signals. The STBC transmitter 108 transmits the parallel signals through a wireless channel.

Referring to FIG. 1b, the receiving apparatus of the double STBC-OFDM system includes CP removers 109, FFT units 110, a MIMO receiver 111, a decoder 112, an interleaver 113, and a mapper 114. The CP removers 109 remove CP codes for a guard interval and transfer the CP code removed signal to the FFT unit 110. The FFT unit 110 performs FFT on the input parallel signal. The MIMO receiver 111 estimates a transmitting data symbol generated through FFT. The MIMO receiver 111 calculates a log likelihood ratio (LLR) from the estimated symbol. The decoder 112 decodes each of data rows transferred from the MIMO receiver 110 and estimates transmission data.

The receiving apparatus includes an interleaver 113 and a mapper 114 for the present invention. The interleaver 113 and the mapper 114 will be described with reference to FIG. 2 in later.

As described above, the STBC-OFDM technology was developed by applying a typical transmit diversity technology to an OFDM technology. The STBC-OFDM technology performs space-time coding in a time domain. The STBC-OFDM technology may improve a link level performance by providing the transmit diversity. However, the STBC-OFDM technology cannot improve the link level performance in a channel that varies with a time. That is, the orthogonality of a signal is broken because an assumed state of a static channel in time-space coding is not guaranteed in a channel that varies with a time. Therefore, the STBC-OFDM technology is applied only to a wideband system such as a wireless LAN system that occupies a wideband width and uses a short packet.

A double STBC-OFDM system was developed by applying a spatial multiplexing technology for transmitting data in parallel through a wireless channel to a typical STBC-OFDM system. The double STBC-OFDM system has a data transmit rate two times higher than that of a typical STBC-OFDM system.

Two types of receivers were used as a receiver for a typical STBC-OFDM system, a nonlinear type receiver using maximum likelihood (ML) detection and a linear type receiver using zero forcing (ZF). The nonlinear type receiver has a shortcoming of high complexity although it has excellent receiving performance. Therefore, it is difficult to realize the nonlinear type receiver. On the contrary, the linear type receiver has an advantage of low complexity although it has comparatively low receiving performance. Due to such an advantage of the linear type receiver, the linear type receiver has been generally used as a detector of a MIMO system.

SUMMARY OF THE INVENTION

An embodiment of the present invention is directed to providing a receiving apparatus for a MIMO system and a method thereof for removing interference between spatial streams with computational complexity reduced and shortening a delay time taken for removing interference by reducing computational complexity of a nonlinear type receiver so as to enable linear and nonlinear type receivers to be used together in a double STBC-OFDM system.

In accordance with an aspect of the present invention, there is provided a receiving apparatus of a multiple input and multiple output (MIMO) system, including: a QR decomposing unit for calculating a single (Q) matrix vector and an upper triangle (R) matrix vector for a receiving signal vector; a first symbol estimation unit for estimating predetermined symbols using the calculated Q matrix vector and R matrix vector; a log likelihood ratio (LLR) calculating unit for calculating log likelihood ratios of unit bits for the estimated symbols; an interference removing unit for receiving a decoded signal that is decided using the calculated log likelihood ratios and removing interference from the receiving signal vector; and a second symbol estimation unit for linearly estimating remaining symbols for the interference removed signal.

The second symbol estimation unit may a zero forcing means for estimating the remaining symbols through performing zero forcing using a noise weight.

The first symbol estimation unit may apply complex points according to a modulation scheme to a predetermined R matrix vector and select one having a minimum value from the calculated complex points as a corresponding symbol.

The first symbol estimation unit may store a result of multiplying a predetermined R vector value and the complex point and estimate another symbols using the stored multiplying result.

The QR decomposing unit may perform QR decomposition on a predetermined part using effective channel matrix characteristics if same data is repeatedly transmitted by changing a satellite and a transmission antenna.

In accordance with another aspect of the present invention, there is provided a receiving method of a multiple input and multiple output (MIMO) system, including: calculating a single (Q) matrix vector and an upper triangle (R) matrix vector for a receiving signal vector; estimating predetermined symbols using the calculated Q matrix vector and R matrix vector; calculating log likelihood ratios of unit bits for the estimated symbols; receiving a decoded signal that is decided using the calculated log likelihood ratios and removing interference from the receiving signal vector; and linearly estimating remaining symbols for the interference removed signal.

In accordance with another aspect of the present invention, there is provided a receiving apparatus of a multiple input and multiple output (MIMO) system, comprising: a QR decomposing unit for calculating a single (Q) matrix vector and an upper triangle (R) matrix vector for a receiving signal vector; a first detection unit for linearly estimating predetermined symbols using the calculated Q matrix vector and the R matrix vector and calculates a log likelihood ratio (LLR) in a bit unit for the estimated symbols; a second detection unit for receiving a signal decoded for the detected symbols, removing interference from the receiving signal vector, and linearly estimating remaining symbols for the interference removed signal; and a decoding unit for decoding the detected symbols from the first detection unit, providing a decoding signal for the predetermined symbols to the second detection unit, and decoding the detected remaining symbols from the second detection unit.

The first detection unit may include a symbol estimator for estimating predetermined symbols using the calculated Q matrix vector and R matrix vector; and a log likelihood ratio (LLR) calculator for calculating log likelihood ratios of bits for the estimated predetermined symbols.

The second detection unit may include an interference remover for receiving a signal decoded for the predetermined estimated symbols; and a zero forcing unit for estimating the remaining symbols through zero forcing using a noise weight for the interference received signal and calculating log likelihood ratios (LLR) of bits for the estimated remaining symbols.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

DESCRIPTION OF SPECIFIC EMBODIMENTS

The advantages, features and aspects of the invention will become apparent from the following description of the embodiments with reference to the accompanying drawings, which is set forth hereinafter.

Figure 1A:
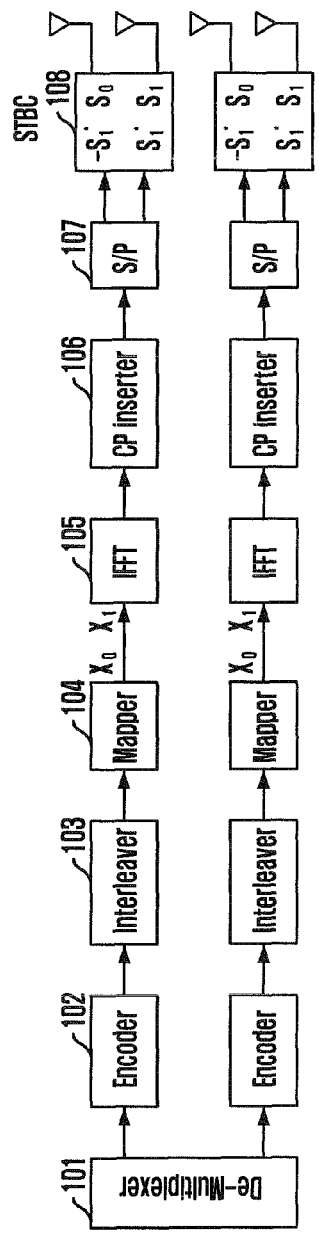
FIGS. 1a and 1b are block diagrams schematically illustrating a double STBC-OFDM system, which is one of MIMO-OFDM technologies.
Figure 1B:
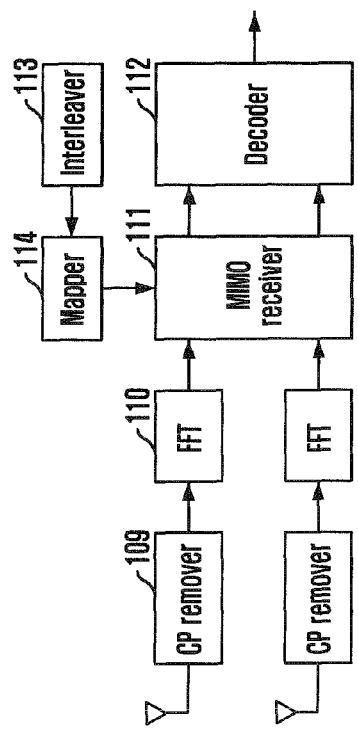

In case of using four transmitting antennas and two receiving antennas as shown in FIGS. 1a and 1b, a space-time diversity coding process is performed in a time domain after IFFT. The space-time diversity coding process, introduced by Alamouti, can be expressed as Eq. 1.

$$x(n, n+1) = \begin{bmatrix} x_0(n, n+1) \\ x_1(n, n+1) \\ x_2(n, n+1) \\ x_3(n, n+1) \end{bmatrix} = \begin{bmatrix} s_0 & -s_1^* \\ s_1 & s_0^* \\ s_2 & -s_3^* \\ s_3 & s_2^* \end{bmatrix} \quad \text{Eq. 1}$$

In Eq. 1, a matrix x(n,n+1) means that four symbols $s_0$, $s_1$, $s_2$, and $s_3$ are transmitted for about 2 symbol times. A row of a matrix x denotes a time domain, and a column thereof denotes transmission of each antenna in FIGS. 1a and 1b. A transmitting apparatus shown in FIG. 1a uses four transmitting antennas. The transmitting apparatus transmits four symbols at a first symbol time without modifying phases thereof. At the next symbol time, the transmitting apparatus shifts phases of four symbols. The transmitting apparatus transmits the phase shifted four symbols using a transmitting antenna different from that used for transmitting the symbols at the previous symbol time.

A receiving apparatus shown in FIG. 1b must receive and process a receiving signal for two symbol times. The received signal may be expressed as Eq. 2. In Eq. 2, r denotes a received signal matrix, and the received signal matrix is a signal after FFT is performed.

$$r = HS + n = \begin{bmatrix} h_{00} & h_{01} & h_{02} & h_{03} \\ h_{10} & h_{11} & h_{12} & h_{13} \end{bmatrix} \begin{bmatrix} s_0 & -s_1^* \\ s_1 & s_0^* \\ s_2 & -s_3^* \\ s_3 & s_2^* \end{bmatrix} + \begin{bmatrix} n_0 & n_2 \\ n_1 & n_3 \end{bmatrix} \quad \text{Eq. 2}$$

Since the receiving apparatus of FIG. 1b receives a signal using two receiving antennas for two symbol times through a frequency selective fading channel, the received signal is expressed as two columns and two rows in Eq. 2. However, a signal received using two antennas may be expressed as a vector having four columns and one row. It is because the transmitting apparatus transmits duplicated signals although phases and positions of transmitting antennas are changed for two symbol times. Therefore, Eq. 2 can be equivalently expressed as Eq. 3.

$$r = Hx + n = \begin{bmatrix} h_{00} & h_{01} & h_{02} & h_{03} \\ \tilde{h}_{01}^* & -\tilde{h}_{00}^* & \tilde{h}_{03}^* & -\tilde{h}_{02}^* \\ h_{10} & h_{11} & h_{12} & h_{13} \\ \tilde{h}_{11}^* & -\tilde{h}_{10}^* & \tilde{h}_{13}^* & -\tilde{h}_{12}^* \end{bmatrix} \begin{bmatrix} s_0 \\ s_1 \\ s_2 \\ s_3 \end{bmatrix} + \quad \text{Eq. 3}$$

$$\begin{bmatrix} n_0 \\ n_1 \\ n_2 \\ n_3 \end{bmatrix} = \begin{bmatrix} H_{00} & H_{01} \\ H_{10} & H_{11} \end{bmatrix} \begin{bmatrix} s_0 \\ s_1 \\ s_2 \\ s_3 \end{bmatrix} + \begin{bmatrix} n_0 \\ n_1 \\ n_2 \\ n_3 \end{bmatrix}$$

Here, an equalizer removes a part of an effective channel matrix H of Eq. 3.

Figure 2:
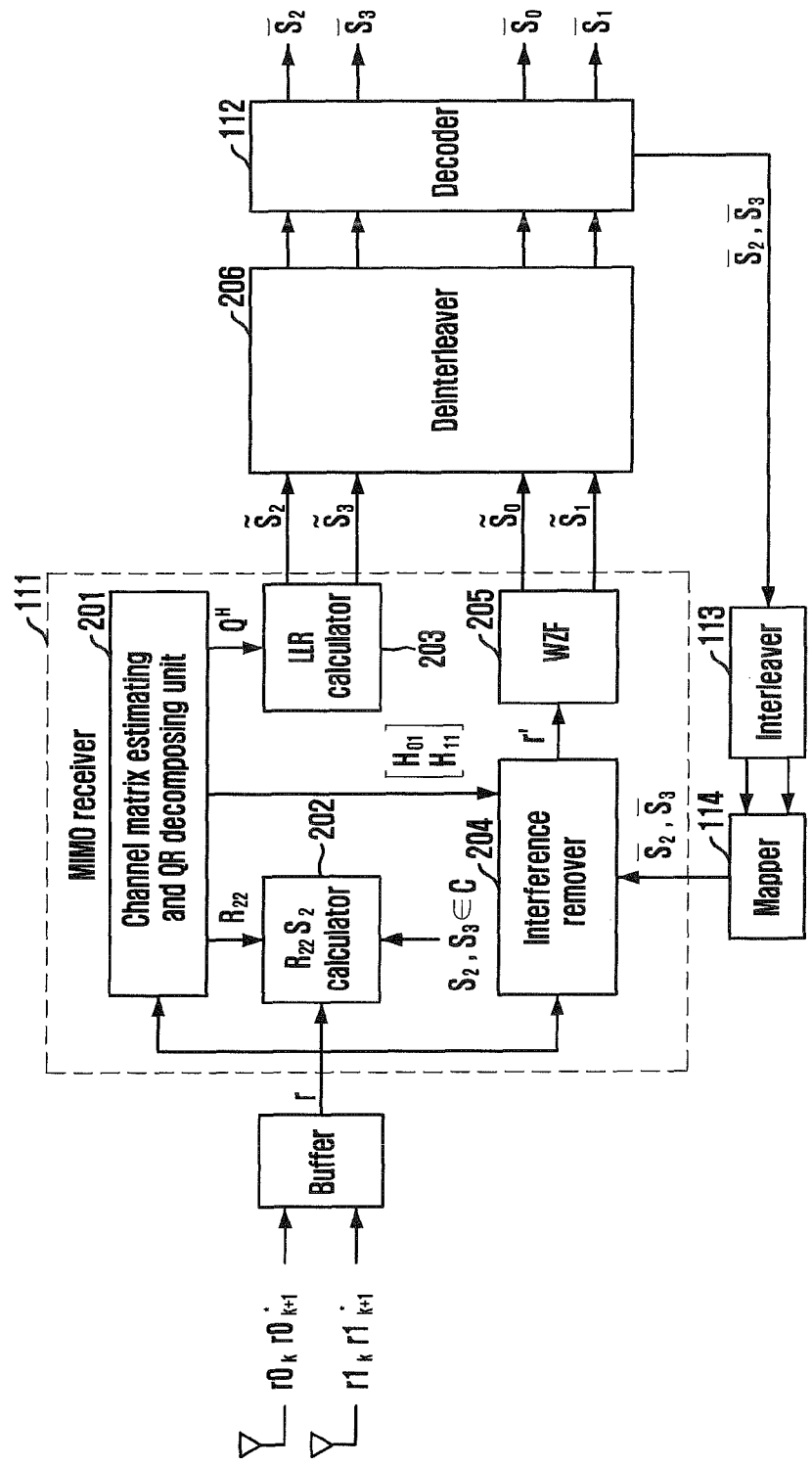
FIG. 2 is a block diagram illustrating a receiving apparatus of a multi-antenna system employing a double STBC-OFDM scheme in accordance with an embodiment of the present invention.

FIG. 2 is a block diagram illustrating a receiving apparatus of a multi-antenna system employing a double STBC-OFDM scheme in accordance with an embodiment of the present invention.

As shown in FIG. 2, the receiving apparatus according to the present embodiment includes a channel matrix estimating and QR decomposing unit 201, a $R_{22}S_2$ calculator 202, an LLR calculator 203, an interference remover 204, and a weighted zero forcing (WZF) linear equalizer 205.

Referring to FIG. 2, the WZF linear equalizer multiplies an inverse matrix $H^{-1}$ to a receiving vector r to eliminate the effective channel matrix H. It may be expressed as Eq. 4. The effective channel matrix H of Eq. 3 can be divided into sub-matrixes $H_{00}$, $H_{01}$, $H_{10}$, and $H_{11}$.

$$\tilde{s} = H^{-1}r = \quad \text{Eq. 4}$$

$$H^{-1}Hx + H^{-1}n = \begin{bmatrix} s_0 \\ s_1 \\ s_2 \\ s_3 \end{bmatrix} + H^{-1}n = \begin{bmatrix} s_0 \\ s_1 \\ s_2 \\ s_3 \end{bmatrix} + \begin{bmatrix} (H^{-1}n)_0 \\ (H^{-1}n)_1 \\ (H^{-1}n)_2 \\ (H^{-1}n)_3 \end{bmatrix} = \begin{bmatrix} \tilde{s}_0 \\ \tilde{s}_1 \\ \tilde{s}_2 \\ \tilde{s}_3 \end{bmatrix}$$

Referring to Eq. 4, a signal s is detected by multiplying the inverse matrix H-1 of the channel matrix H to the receiving vector 4. However, a noise component vector ($n_0$, $n_1$, $n_2$, and $n_3$) are amplified as much as multiplying of the inverse matrix $H^{-1}$ of the matrix H. Here, the amplified noise vector components are expressed as $(H^{-1}n)_0$, $(H^{-1}n)_1$, $(H^{-1}n)_2$, and $(H^{-1}n)_3$ at every four estimated symbols $s_0$, $s_1$, $s_2$, and $s_3$. Here, $(\ )_i$ denotes a $i^{th}$ row of a matrix in a pair of parenthesis. Since a typical ZF linear equalizer detects a signal with amplification of noise components ignored, noises are amplified as much as the inverse matrix $H^{-1}$ of the matrix H. Therefore, the receiving performance of a linear detector/equalizer deteriorates.

Hereinafter, a method for decoding a multiple antenna signal using linear and nonlinear receiving schemes together will be described in detail.

Referring to FIG. 2, the channel matrix estimating and QR decomposing unit 201 calculates a Q matrix vector and a R matrix vector by performing QR decomposition based on a channel matrix of Eq. 3. The result of QR decomposition can be expressed as Eq. 5. In Eq. 5, Q denotes a unitary matrix ($Q^HQ=I$), and R denotes an upper triangular matrix.

$$H = \begin{bmatrix} h_{00} & h_{01} & h_{02} & h_{03} \\ h_{01}^* & -h_{00}^* & h_{03}^* & -h_{02}^* \\ h_{10} & h_{11} & h_{12} & h_{13} \\ h_{11}^* & -h_{10}^* & h_{13}^* & -h_{12}^* \end{bmatrix} = [h_0 \; h_1 \; h_2 \; h_3] \quad \text{Eq. 5}$$

$$= Q \cdot R = \begin{bmatrix} q_{00} & q_{01} & q_{02} & q_{03} \\ q_{01}^* & -q_{00}^* & q_{03}^* & -q_{02}^* \\ q_{10} & q_{11} & q_{12} & q_{13} \\ q_{11}^* & -q_{10}^* & q_{13}^* & -q_{12}^* \end{bmatrix} \begin{bmatrix} R_{00} & 0 & R_{02} & R_{03} \\ 0 & R_{00} & -R_{03}^* & R_{02}^* \\ 0 & 0 & R_{22} & 0 \\ 0 & 0 & 0 & R_{22} \end{bmatrix}$$

Eq. 6 shows calculation of a Q matrix vector, and Eq. 7 shows calculation of a R matrix vector. As shown, the Q matrix vector and the R matrix vector are calculated using well-known methods.

$$q_{i0} = h_{0,i}/\|h_0\|^2 \quad \text{Eq. 6}$$

$$q_{i2} = \frac{h_{2,i} - \sum_{j=0}^{1} \langle h_2, q_j \rangle \cdot q_{j,i}}{\left\| h_{2,i} - \sum_{j=0}^{1} \langle h_2, q_j \rangle \cdot q_{j,i} \right\|^2}$$

$$i \in \{0, 1, 2, 3\}$$

$$R_{00} = R_{11} = \|h_0\|^2$$
$$R_{01} = \langle h_1, q_0 \rangle = 0$$
$$R_{02} = \langle h_2, q_0 \rangle$$
$$R_{03} = \langle h_3, q_0 \rangle$$
$$R_{12} = -\langle h_2, q_0 \rangle^*$$
$$R_{13} = -\langle h_3, q_0 \rangle^*$$
$$R_{22} = \left\| h_2 - \sum_{j=0}^{1} \langle h_2, q_j \rangle \cdot q_j \right\|^2$$
$$R_{23} = \langle h_3, q_2 \rangle = 0$$
$$R_{33} = R_{22} \quad \text{Eq. 7}$$

As shown in Eq. 7, an R matrix vector $R_{23}$ is calculated as 0; $R_{22}=R_{33}$; $R_{00}=R_{11}$; $-R_{03}^*=R_{12}$; and $R_{13}=R_{02}^*$. Above features are originated from a structure of a channel matrix in a double STBC-OFDM scheme. Therefore, a signal must be processed like Eq. 8 in order to detect a receiving signal shown in Eq. 4.

$$Q^H r = Q^H(Hx + n) = Q^H QRx + Q^H n = Rx + Q^H n =$$ Eq. 8

$$\begin{bmatrix} R_{00} & 0 & R_{02} & R_{03} \\ 0 & R_{00} & -R_{03}^* & R_{02}^* \\ 0 & 0 & R_{22} & 0 \\ 0 & 0 & 0 & R_{22} \end{bmatrix} \begin{bmatrix} s_0 \\ s_1 \\ s_2 \\ s_3 \end{bmatrix} + \begin{bmatrix} q_{00} & q_{01} & q_{02} & q_{03} \\ q_{01}^* & -q_{00}^* & q_{03}^* & -q_{02}^* \\ q_{10} & q_{11} & q_{12} & q_{13} \\ q_{11}^* & -q_{10}^* & q_{13}^* & -q_{12}^* \end{bmatrix}^H \begin{bmatrix} n_0 \\ n_1 \\ n_2 \\ n_3 \end{bmatrix}$$

In a general MIMO-OFDM system without the above features, a Q matrix and an R matrix can be acquired by performing QR decomposition based on a channel matrix H as shown in Eq. 9. In Eq. 9, $Rx+Q^H n$ can be calculated by applying the acquired $Q^H$ matrix.

$$H = \begin{bmatrix} h_{00} & h_{01} & h_{02} & h_{03} \\ h_{10} & h_{11} & h_{12} & h_{13} \\ h_{20} & h_{21} & h_{22} & h_{23} \\ h_{30} & h_{31} & h_{32} & h_{33} \end{bmatrix} = Q \cdot R =$$ Eq. 9

$$\begin{bmatrix} q_{00} & q_{01} & q_{02} & q_{03} \\ q_{10} & q_{11} & q_{12} & q_{13} \\ q_{20} & q_{21} & q_{22} & q_{23} \\ q_{30} & q_{31} & q_{32} & q_{33} \end{bmatrix} \begin{bmatrix} R_{00} & R_{01} & R_{02} & R_{03} \\ 0 & R_{11} & R_{12} & R_{13} \\ 0 & 0 & R_{22} & R_{23} \\ 0 & 0 & 0 & R_{33} \end{bmatrix}$$

$$Q^H r = Q^H(Hx + n) = Q^H QRx + Q^H n = Rx + Q^H n =$$

$$\begin{bmatrix} R_{00} & R_{01} & R_{02} & R_{03} \\ 0 & R_{11} & R_{12} & R_{13} \\ 0 & 0 & R_{22} & R_{23} \\ 0 & 0 & 0 & R_{33} \end{bmatrix} \begin{bmatrix} s_0 \\ s_1 \\ s_2 \\ s_3 \end{bmatrix} + \begin{bmatrix} q_{00} & q_{01} & q_{02} & q_{03} \\ q_{10} & q_{11} & q_{12} & q_{13} \\ q_{20} & q_{21} & q_{22} & q_{23} \\ q_{30} & q_{31} & q_{32} & q_{33} \end{bmatrix}^H \begin{bmatrix} n_0 \\ n_1 \\ n_2 \\ n_3 \end{bmatrix}$$

The modulated signal can be estimated based on the following Eq. 10.

$$\tilde{s}_0 = \arg\min_{s_0,s_1,s_2,s_3 \in C} |(Q^H)_0 r - R_{00}s_0 - R_{01}s_1 - R_{02}s_2 - R_{03}s_3|^2$$ Eq. 10

$$\tilde{s}_1 = \arg\min_{s_1,s_2,s_3 \in C} |(Q^H)_1 r - R_{11}s_1 - R_{12}s_2 - R_{13}s_3|^2$$

$$\tilde{s}_2 = \arg\min_{s_2,s_3 \in C} |(Q^H)_2 r - R_{22}s_2 - R_{23}s_3|^2$$

$$\tilde{s}_3 = \arg\min_{s_3 \in C} |(Q^H)_3 r - R_{33}s_3|^2$$

When a 64-QAM modulation scheme is used, $\tilde{s}_3$ cannot be estimated by applying 64 constellations to Eq. 10. In order to estimate $\tilde{s}_3$, a signal $s_3$ satisfies a condition that a sum of result values of all equations in Eq. 10 is the minimum value. That is, all combinations of $s_0$, $s_1$, $s_2$ and $s_3$ are applied to $\tilde{s}_0+\tilde{s}_1+\tilde{s}_2+\tilde{s}_3$ for finding an optimal combination.

In the present invention, all combinations of $s_0$, $s_1$, $s_2$ and $s_3$ are not required to estimate modulation signals, but $s_2$ and $s_3$ are firstly estimated. Based on Eq. 8, $\tilde{s}_2$ and $\tilde{s}_3$ shown in Eq. 10 are simplified as the following Eq. 11.

In other words, candidate symbol values are calculated by applying complex points, i.e., constellation, according to a modulation scheme by a predetermined R matrix vector and a corresponding signal is estimated by selecting a minimum candidate symbol value from the calculated candidate symbol values.

$$\tilde{s}_2 = \arg\min_{s_2 \in C} |(Q^H)_2 r - R_{22}s_2|^2$$ Eq. 11

$$\tilde{s}_3 = \arg\min_{s_3 \in C} |(Q^H)_3 r - R_{22}s_3|^2$$

In Eq. 11, ( )$_i$ denotes a vector corresponding to an $i^{th}$ row. Eq. 11 estimates transmitting signals $s_2$ and $s_3$. In order to reduce implementation complexity, the $R_{22}S_2$ calculator 202 stores a result of calculating $R_{22}S_2$. If the result of calculating $R_{22}S_2$ is stored, it is not necessary to calculate a value of $R_{22}S_3$. It is because $s_0$, $s_1$, $s_2$, and $s_3$ are belonging to the same constellation domain. If a $2^{nd}$ row and a $3^{rd}$ column are not 0 in Eq. 5, Eq. 11 is not satisfied and about 4096 times (64×64) of multiplications are required to estimate combination of signals $s_2$ and $s_3$ which provide a minimum value.

After selecting $s_2$ and $s_3$ having the smallest minimum value based on a hard decision scheme through Eq. 11, demapping is performed using a demapper. A demapping value can be input to a channel decoder. In order to improve signal detection performance, the LLR calculator 203 calculates a log likelihood ratio (LLR) value corresponding to bit information of the estimated symbols $s_2$ and $s_3$ in a bit unit. The LLR calculation in a bit unit of $s_2$ and $s_3$ can be expressed as Eq. 12.

$$LLR(s_2, b_q) = \arg\min_{s_2^0 \in C_{b_q}^0} |(Q^H)_2 r - R_{22}s_2^0| -$$ Eq. 12

$$\arg\min_{s_2^1 \in C_{b_q}^1} |(Q^H)_2 r - R_{22}s_2^1|$$

$$LR(s_3, b_q) = \arg\min_{s_3^0 \in C_{b_q}^0} |(Q^H)_2 r - R_{22}s_3^0| - \arg\min_{s_3^1 \in C_{b_q}^1} |(Q^H)_2 r - R_{22}s_3^1|$$

In Eq. 12, $b_q$ denotes a LLR value corresponding to a $q^{th}$ bit of symbols $s_2$ and $s_3$. $C_{b_q}^0$ denotes when a $q^{th}$ bit on constellation is 0. On the contrary, $C_{b_q}^1$ denotes when a $q^{th}$ bit on constellation is 1.

Figure 3:
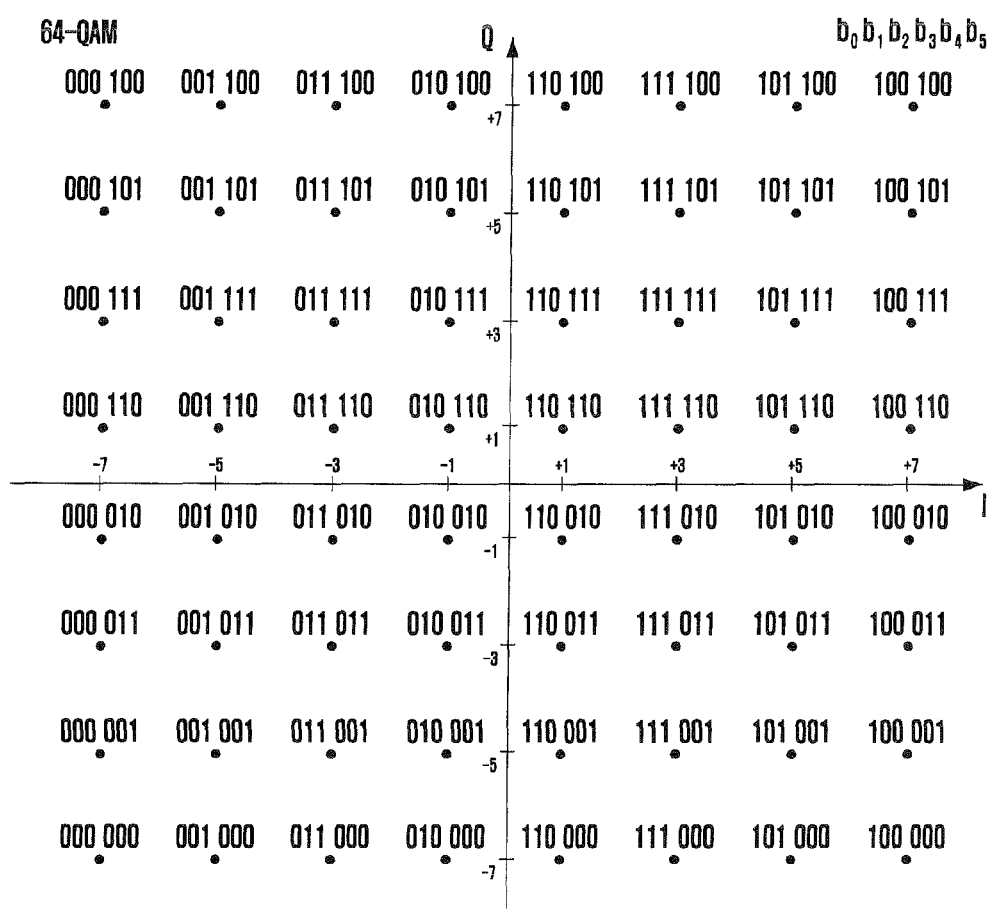
FIG. 3 shows a gray code applied when a 64-QAM modulation scheme is used.

FIG. 3 shows a gray code applied when a 64-QAM modulation scheme is used. Since $R_{22}s_2$ is equal to $R_{22}s_3$, 64 multiplying results for $R_{22}s_2$ are calculated and stored in advance, and the stored multiplying results are used when a LLR value for a predetermined bit is calculated. For example, when the first bit of a LLR is calculated, a minimum value of $|(Q^H)_2 r - R_{22}s_2^0|$ is calculated from values of $R_{22}s_2^0$ corresponding to left 32 symbols. Also, a minimum value of $|(Q^H)_2 r - R_{22}s_2^1|$ from values of $R_{22}s_2^1$ corresponding to right 32 symbols. Based on the calculated minimum values, a LLR value corresponding to a $0^{th}$ bit of $s_2$ LLR($s_2, b_0$) can be calculated. The described calculations are repeated until calculating a LLR value of a $5^{th}$ bit LLR($s_2, b_5$).

Referring to FIG. 2, LLR values of unit bits corresponding to symbols $s_2$ and $s_3$ are calculated using the LLR calculator 203. Then, $\tilde{s}_2, \tilde{s}_3$ are input to the channel decoder 112 through the deinterleaver 206. The channel decoder 112 is a viterby decoder and performs channel decoding The decoded signals $\hat{s}_2, \hat{s}_3$ are input to the interference remover 204 through the interleaver 113 and the mapper 114. The interference remover 204 removes interference from an initially received receiving vector r by multiplying the decoded signals $\hat{s}_2, \hat{s}_3$ and a channel matrix. The interference removed signal can be expressed as Eq. 13.

$$r' = r - \begin{bmatrix} H_{01} \\ H_{11} \end{bmatrix} \begin{bmatrix} \tilde{s}_2 \\ \tilde{s}_3 \end{bmatrix} \qquad \text{Eq. 13}$$

The WZF equalizer 205 linearly detects signals $\tilde{s}_0, \tilde{s}_1$ by multiplying a predetermined weight to the interference removed signals. Such a process of detecting a signal through zero forcing can be expressed as Eq. 14.

$$\begin{bmatrix} \hat{s}_0 \\ \hat{s}_1 \end{bmatrix} = [H_{00}^* \; H_{10}^*]^{-1} r' = Wr' \qquad \text{Eq. 14}$$

In case of 16-QAM, the calculation of LLR values for bits of the detected signal so using a noise weight can be expressed as Eq. 15. Also, 4 LLR values for bits of each estimated signal $s_1$, $s_2$ and $s_3$ can be calculated based on Eq. 15 in the same way.

$$b_0 = \frac{\text{Re}(\hat{s}_0)}{\|([H_{00}^* \; H_{10}^*]^{-1})_0\|^2} \qquad \text{Eq. 15}$$

$$b_1 = \frac{(2/\sqrt{10}) - |\text{Re}(\hat{s}_0)|}{\|([H_{00}^* \; H_{10}^*]^{-1})_0\|^2}$$

$$b_2 = \frac{\text{Im}(\hat{s}_0)}{\|([H_{00}^* \; H_{10}^*]^{-1})_0\|^2}$$

$$b_3 = \frac{(2/\sqrt{10}) - |\text{Im}(\hat{s}_0)|}{\|([H_{00}^* \; H_{10}^*]^{-1})_0\|^2}$$

In case of 64-QAM, the calculation of LLR values for bits of the detected signal $s_1$ using a noise weight can be expressed as Eq. 16. Also, 6 LLR values for bits of each estimated signal $s_1$, $s_2$ and $s_3$ can be calculated based on Eq. 16 in the same way.

$$b_0 = \frac{\text{Re}(\hat{s}_0)}{\|([H_{00}^* \; H_{10}^*]^{-1})_0\|^2} \qquad \text{Eq. 16}$$

$$b_1 = \frac{(4/\sqrt{42}) - |\text{Re}(\hat{s}_0)|}{\|([H_{00}^* \; H_{10}^*]^{-1})_0\|^2}$$

$$b_2 = \frac{(2/\sqrt{42}) - |(4/\sqrt{42}) - |\text{Re}(\hat{s}_0)||}{\|([H_{00}^* \; H_{10}^*]^{-1})_0\|^2}$$

$$b_3 = \frac{\text{Im}(\hat{s}_0)}{\|([H_{00}^* \; H_{10}^*]^{-1})_0\|^2}$$

$$b_4 = \frac{(4/\sqrt{42}) - |\text{Im}(\hat{s}_0)|}{\|([H_{00}^* \; H_{10}^*]^{-1})_0\|^2}$$

$$b_5 = \frac{(2/\sqrt{42}) - |(4/\sqrt{42}) - |\text{Im}(\hat{s}_0)||}{\|([H_{00}^* \; H_{10}^*]^{-1})_0\|^2}$$

In case of BPSK and QPSK modulation schemes, equations for $b_0$ and $b_2$ in Eq. 16 are applied. As shown in Eq. 16, a size of a soft-bit signal is in inverse proportion as much as norm $\|([H_{00}^* \; H_{10}^*]^{-1})_0\|^2$, which is a square of a degree of amplifying a noise in Eq. 16, as shown in Eq. 16. Therefore, the realiability is automatically decided. A weighted soft-bit value provides significant performance gain when a soft input viterby decoder performs decoding in FIG. 2.

Hereinafter, a receiving apparatus for detecting a receiving signal in a double STBC-OFDM multiple antenna system and a method thereof according to an embodiment of the present invention will be described briefly again.

At first, the channel matrix estimating and QR decomposing unit 201 calculates a single (Q) matrix vector and an upper triangular (R) matrix vector for a receiving signal vector after FFT.

The $R_{22}s_2$ calculator 202 estimates predetermined symbols $s_2$ and $s_3$ from the receiving signal vector using the calculated Q matrix vector and R matrix vector. Here, the $R_{22}s_2$ calculator 202 subtracts results of multiplying a predetermined R matrix vector $R_{22}$ and a symbol value $s_2$ of a complex point according to a modulation scheme from results of multiplying a Q matrix vector and a receiving signal vector. The $R_{22}s_2$ calculator 202 estimates a transmit signal symbol by finding the smallest one from square of the subtracting results.

The LLR calculator 203 calculates LLR values corresponding to unit bits of the estimated symbol. Here, the LLR calculator 203 previously calculates the multiplying values for a complex point of a modulation scheme. The LLR calculates 203 uses the previously calculated multiplying values to calculate a LLR value of a predetermined bit.

The decoder 112 performs decoding for a predetermined symbol using a LLR value of a predetermined symbol calculated by the LLR calculator 230. The signal decoded by the decoder is input to the interference remover 204 through the interleaver and the mapper.

The interference remover 204 removes interference by multiplying a channel matrix and a decoded signal and subtracting the multiplying result from the receiving signal vector. The WZF equalizer 205 performs zero forcing using a noise weight for the interference removed signal. The WZF equalizer 205 calculates a LLR for remaining symbols and transfers the calculated LLR values to the decoder 112 through the deinterleaver 206. The decoder 112 decodes symbols using the LLR values of the remaining symbols, transferred from the WZF equalizer 205.

According to the present invention, a liner and nonlinear type receivers are used at the same time in a double STBC-OFDM system by reducing computational complexity of the nonlinear type receiver. Also, interference between spatial streams is removed while reducing hardware complexity. Furthermore, a delay time taken for removing interference can be shortened. Therefore, a high performance MIMO receiver can be embodied according to the present invention.

As described above, the technology of the present invention can be realized as a program and stored in a computer-readable recording medium, such as CD-ROM, RAM, ROM, floppy disk, hard disk and magneto-optical disk. Since the process can be easily implemented by those skilled in the art of the present invention, further description will not be provided herein.

While the present invention has been described with respect to the specific embodiments, it will be apparent to those skilled in the art that various changes and modifications may be made without departing from the spirit and scope of the invention as defined in the following claims.

What is claimed is:

1. A receiving apparatus for estimating symbols of a receiving signal vector including a plurality of symbols in a multiple input and multiple output (MIMO) system, the receiving apparatus comprising:

a QR decomposing means for calculating a single (Q) matrix vector and an upper triangle (R) matrix vector for the receiving signal vector;

a first symbol estimation means for estimating predetermined symbols of the plurality of symbols using the calculated Q matrix vector and R matrix vector;

a log likelihood ratio (LLR) calculating means for calculating log likelihood ratios of unit bits for the estimated symbols;

a decoding means for decoding the estimated symbols from the first symbol estimation means using the calculated log likelihood ratios calculated by the LLR calculating means;

an interference removing means for receiving a decoded signal that is decided using the calculated log likelihood ratios and removing interference from the receiving signal vector; and a second symbol estimation means for linearly estimating remaining symbols of the plurality of symbols excluding the predetermined symbols using the interference removed signal produced by the interference removing means, wherein the decoding means further decodes the estimated remaining symbols from the second symbol estimation means, and outputs the decoded estimated symbols from the first and second symbol estimation means.

2. The receiving apparatus of claim 1, wherein the second symbol estimation means is a zero forcing means for estimating the remaining symbols through performing zero forcing using a noise weight.

3. The receiving apparatus of claim 2, wherein the zero forcing means calculates log likelihood ratios (LLR) of unit bits using a noise weight for the estimated remaining symbols.

4. The receiving apparatus of claim 2, wherein the first symbol estimation means applies complex points according to a modulation scheme to a predetermined R matrix vector and selects one having a minimum value from the calculated complex points as a corresponding symbol.

5. The receiving apparatus of claim 4, wherein the first symbol estimation means stores a result of multiplying a predetermined R vector value and the complex point and estimates another symbols using the stored multiplying result.

6. A receiving apparatus for estimating symbols of a receiving signal vector including a plurality of symbols in a multiple input and multiple output (MIMO) system, the receiving apparatus comprising:

a QR decomposing means for calculating a single (Q) matrix vector and an upper triangle (R) matrix vector for the receiving signal vector;

a first detection means for linearly estimating predetermined symbols of the plurality of symbols using the calculated Q matrix vector and the R matrix vector and calculating a log likelihood ratio (LLR) in a bit unit for the estimated symbols;

a second detection means for receiving a signal decoded from the symbols estimated by the first detection means, removing interference from the receiving signal vector, and linearly estimating remaining symbols of the plurality of symbols excluding the predetermined symbols using the interference removed signal; and a decoding means for decoding the estimated symbols from the first detection means, providing a decoding signal for the predetermined symbols to the second detection means, decoding the detected remaining symbols from the second detection means, and outputting the decoded symbols from the first and second detection means.

7. The receiving apparatus of claim 6, further comprising:

a deinterleaving means for deinterleaving and decoding outputs of the first and second detection means;

an interleaving means for interleaving output of the decoding means; and a mapping means for providing the output of the interleaving means to the second detection means by mapping the output of the interleaving mean.

8. The receiving apparatus of claim 7, wherein the first detection means includes:

a symbol estimation means for estimating predetermined symbols using the calculated Q matrix vector and R matrix vector; and a log likelihood ratio (LLR) calculating means for calculating log likelihood ratios of bits for the estimated predetermined symbols.

9. The receiving apparatus of claim 8, wherein the second detection means includes:

an interference removing means for receiving a signal decoded for the predetermined estimated symbols through the mapping means; and a zero forcing means for estimating the remaining symbols through zero forcing using a noise weight for the interference received signal and calculating log likelihood ratios (LLR) of bits for the estimated remaining symbols.

10. A receiving method for estimating symbols of a receiving signal vector including a plurality of symbols in a multiple input and multiple output (MIMO) system, the receiving method comprising:

calculating a single (Q) matrix vector and an upper triangle (R) matrix vector for the receiving signal vector;

estimating predetermined symbols of the plurality of symbols using the calculated Q matrix vector and R matrix vector;

calculating log likelihood ratios of unit bits for the estimated symbols;

decoding the estimated predetermined symbols using the calculated log likelihood ratios of unit bits;

receiving a decoded signal that is decided using the calculated log likelihood ratios and removing interference from the receiving signal vector;

linearly estimating remaining symbols of the plurality of symbols excluding the predetermined symbols using the interference removed signal;

decoding the estimated remaining symbols; and jointly outputting the decoded estimated predetermined and decoded estimated remaining symbols.

* * * * *